United States Patent
Carville et al.

[15] 3,693,536
[45] Sept. 26, 1972

[54] APPARATUS AND METHOD OF TOASTING BREAD LIKE ARTICLES

[72] Inventors: James G. Carville, Westfield; John F. Rekesius, Watchung, both of N.J.

[73] Assignee: Savory Equipment, Inc., Newark, N.J.

[22] Filed: June 29, 1970

[21] Appl. No.: 50,783

[52] U.S. Cl. ................... 99/386, 99/400, 99/443 C, 219/539
[51] Int. Cl. ............................................. A47j 37/08
[58] Field of Search ...... 219/388, 535, 538, 539, 486, 219/482, 395, 409, 445, 478; 99/386, 387, 391, 393, 400, 423, 427, 443 C

[56] References Cited

UNITED STATES PATENTS

| | | | |
|---|---|---|---|
| 2,217,465 | 10/1940 | Barnsteiner et al. | 219/539 X |
| 1,044,270 | 11/1912 | Shaler | 219/486 X |
| 2,238,309 | 4/1941 | Cramer | 99/386 |
| 1,555,336 | 9/1925 | Vaughan | 99/386 X |
| 1,662,847 | 3/1928 | Cook | 99/443 |
| 3,425,341 | 2/1969 | McGinley | 99/386 X |
| 2,636,431 | 4/1953 | Baltz et al. | 99/386 X |
| 2,903,549 | 9/1959 | Joseph | 219/538 X |
| 2,392,076 | 1/1946 | Wiegand | 219/445 |
| 2,168,773 | 8/1939 | Parr | 99/386 X |
| 3,400,651 | 9/1968 | Hatch | 99/386 X |

Primary Examiner—Billy J. Wilhite
Attorney—Meyer, Tilberry & Body

[57] ABSTRACT

An electric toasting apparatus comprised of a conveyor adapted to support articles to be toasted and having the transverse width and a preselected rate of movement in a longitudinal direction. The apparatus includes at least two radiant heater means disposed adjacent the conveyor, each arranged to provide generally uniform heating conditions across substantially the entire transverse width of the conveyor and along at least a substantial portion of the longitudinal length of the conveyor. One heater runs constantly and has a heat output to bring the articles close to the toasting point. The other is modulated to control its heat output and thus the total output of both heater means to give the desired degree of toasting. The method comprises the steps of: (a) conveying the articles past and adjacent to the first and second heater means at a uniform rate; (b) fully energizing the first heater means in an amount sufficient to bring the articles at least close to the toasting point; and (c) simultaneously energizing the second heater means to produce less than its maximum heat output, but sufficiently to fully toast the articles.

9 Claims, 5 Drawing Figures

INVENTORS.
JAMES G. CARVILLE
JOHN F. REKESIUS
BY Meyer, Tillery & Body
ATTORNEYS.

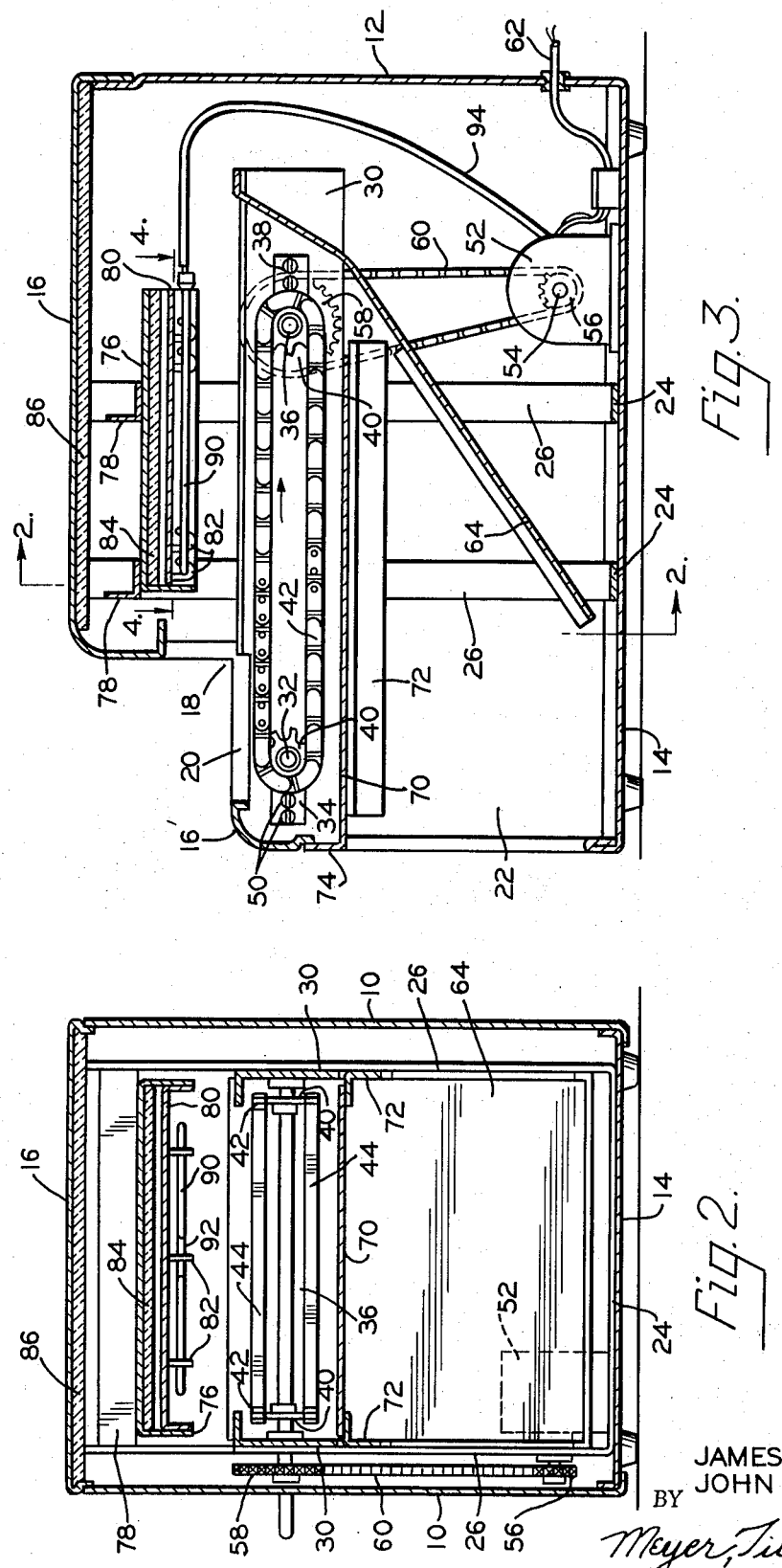

APPARATUS AND METHOD OF TOASTING BREAD LIKE ARTICLES

This invention pertains to the food processing equipment art and, more particularly, to an apparatus and method of toasting bread like articles.

Electric toasting devices have heretofore comprised a housing and a conveyor horizontally disposed within the housing. At the upper end of the housing is a horizontal opening through which articles to be toasted may be placed upon the conveyor, and there is further provided an opening in the lower portion of the housing through which fully toasted articles are delivered from the conveyor. A heater means is supported above the conveyor and adapted to reflect heat downwardly for toasting articles thereon.

Toasting devices of the type described above, have heretofore employed heater means comprised of a pair of heating elements constructed from a coil of electrical resistance wire which is strung through insulating hangers in order to support the elements above the conveyor. One of the heating elements was a low wattage type and includes a pair of legs which extended along the opposed edges of the conveyor and were interconnected by a transversely extending base portion. The sole function of this heating element was to maintain the interior of the housing at a preselected temperature, and it did not materially contribute to the toasting of the articles carried by the conveyor. The other heating element was comprised of a plurality of parallel legs which extended longitudinally and were disposed across the width of the conveyor. This heating element was energized to at least less than its full capacity and provided the requisite heat output to toast the articles which passed beneath it on the conveyor.

One of the principal problems with toasting devices of the type heretofore described, is the lack of uniform toasting conditions for all articles placed on the conveyor. That is, the arrangement of the heating elements produced hot and cold spots across the width of the conveyor, thereby excessively toasting some articles or portions thereof and inadequately toasting other articles or portions thereof. As such, it has heretofore been impossible to be assured that a plurality of articles placed at random locations on the conveyor will all be toasted to substantially the same condition.

Another problem with toasting devices of this type results from the fact that only one of the heating elements is used for toasting the articles, while the other element merely serves as a preheater to maintain the interior of the housing at a preselected temperature. In such an arrangement, it is necessary to provide a higher power input, approximately 1,600 watts, to the other element which does all of the toasting. This high input is undesirable because it required control units having a high power handling capability.

The present invention contemplates a new and improved apparatus and method of toasting bread like articles which overcomes all of the above problems and others, and provides an electric toasting device which has generally uniform heating conditions across substantially the entire transverse width of the conveyor, and along at least a substantial portion of the longitudinal length of the conveyor adjacent the heater means.

In accordance with the present invention there is provided in an electric toasting apparatus comprised of a conveyor adapted to support articles to be toasted and having a transverse width and a preselected rate of movement in a longitudinal direction, the improvement comprising at least two electric radiant heater means each disposed adjacent the conveyor; each of the heater means providing generally uniform heating conditions across substantially the entire transverse width of the conveyor and along at least a substantial portion of longitudinal length of the conveyor adjacent the heater means; and, means operating one heater at all times at full power whereby the other heater is partly heated by radiation and means for independently controlling the energization of the other heater means to further heat it.

In accordance with a more limited aspect of the invention, there is provided first and second close spaced electric radiant heater means, the first heater means having a uniform heat output across the entire width of the conveyor sufficient to heat the articles to be toasted to a temperature at least approaching the caramelizing temperature and to preheat the second heater by radiation, and means for additionally heating the second heater means so that it has a maximum heat output sufficient to further heat the articles to more than a full toasted condition.

In accordance with another aspect of the invention, there is provided a method of toasting bread like articles comprising the steps of: (a) conveying the articles past and adjacent to first and second heater means at a uniform rate; (b) energizing the first heater means to produce a heat output which brings the articles close to the toasting temperature; and (c) simultaneously, energizing the second heater means to produce less than its maximum heat output, but sufficient to fully toast the articles.

The principal object of the present invention is to provide an apparatus and method of toasting bread like articles, wherein all articles are uniformly toasted regardless of their location on the conveyor.

Another object of the present invention is to provide an electric toasting apparatus, wherein there are two separate heating units uniformly heating the entire toasting area, one of which is operated at full power at all times, and the other of which has its power input modulated so as to regulate the toasting action.

An additional object of the present invention is to provide an electric toasting apparatus which is capable of uniformly toasting a large volume of bread like articles in a preselected period of time.

A further object of the present invention is to provide an improved electric heater arrangement for automatic toasting apparatus which is simple and economical to manufacture and which gives improved toasting characteristics.

A further object of the invention is the provision of a new and improved automatic electric toaster wherein a power control of lower power handling capacity can be employed to regulate the degree of toasting.

These and other objects and advantages will become apparent from the following description used to illustrate the preferred embodiment of the invention when read in conjunction with the accompanying drawings in which:

FIG. 2 is a cross-sectional view taken along line 2—2 of FIG. 3;

FIG. 3 is a cross-sectional view of the toasting apparatus illustrated in FIG. 1;

Figure 1:
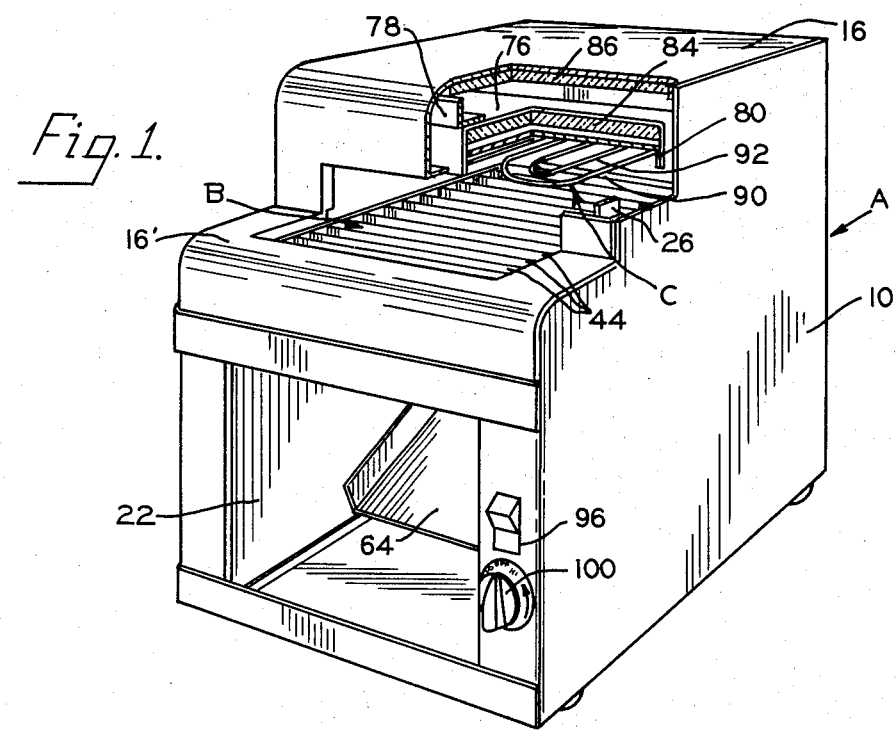
FIG. 1 is a cut-away, perspective view of a toasting apparatus constructed in accordance with the preferred embodiment of the present invention.

Referring now to the drawings wherein the showings are for the purpose of illustrating a preferred embodiment of the invention only and not for the purpose of limiting same, FIG. 1 shows a perspective view of an electric toasting apparatus constructed in accordance with the present invention. The toasting apparatus includes a housing, designated generally by the reference letter A, a conveyor, designated generally by the reference letter B, disposed therein and adapted to support articles to be toasted, and radiant heater means C.

As best shown in FIGS. 2 and 3, the housing A is preferably constructed of sheet metal and comprises a pair of opposed side walls 10, a rear wall 12, a bottom wall 14 and a top wall 16 which are secured together in a conventional manner. The side walls 10 are notched at their upper forwardmost ends, as at 18, and are connected by the forward portion 16' of the top wall 16 which extends downward and outward throughout the notched area to tie the side walls together. This arrangement separates the open front end of the housing A into a horizontal disposed receiving opening 20, at the upper portion of the front end and a vertically disposed delivery opening 22 at the lower portion. The conveyor B is in communication with the receiving opening 20, whereby articles to be toasted may be easily placed upon the conveyor and subsequently returned after the toasting operation by way of the delivery opening 22.

Within the housing A there is mounted a pair of spaced U-shaped supporting members comprised of a connecting portion 24 which rests upon the bottom wall 14 and a leg portion 26 which extends vertically upward therefrom and is disposed along the side walls 10. A pair of opposed horizontal supporting bars 30 are mounted upon the leg portions 26 and extend longitudinally in the housing A. The conveyor B is mounted upon the supporting bars 30 and preferably includes a front shaft 32 which is journaled in bearing brackets 34 mounted upon the supporting bars, and a rear shaft 36 which is journaled in bearing brackets 38 which are also mounted upon the supporting bars. The shafts 32, 36 support an opposed pair of sprockets 40 which are spaced upon the shafts and carry thereon side chains 42. The chains 42 carry between them a series of transverse conveyor bars 44, upon which articles to be toasted may be disposed. If desired, one or both of the brackets 34, 38 may be slotted to receive fastening screws 50 to provide adjustment of the brackets for tightening the chains 42 when necessary.

The conveyor B is driven to move in the direction of the arrow shown in FIG. 3 by means of a suitable electric motor 52, which is preferably mounted upon the bottom wall 14. The motor 52 includes a shaft 54 with a sprocket 58 secured thereto for rotation therewith, and is connected to a sprocket 58 on the rear shaft 36 by means of a drive chain 60. The motor 52 is adapted to be connected to an external power source by means of cord 62.

In order to provide for the delivery of articles which have been toasted in the apparatus, there is included a chute 64 which is secured at its inner end to the supporting bars 30. Toasted articles are deposited on the chute 64 by the conveyor and slide down the chute to the delivery opening 22.

A crumb tray is provided in the housing A and comprises a plate 70 which is slideably mounted upon opposed brackets 72. The crumb tray is insertably onto the brackets 72 from the front of the toasting apparatus through the delivery opening 22, and has an upstanding front wall 74. The crumb tray is adapted to catch particles which fall off the articles being toasted on the conveyor B.

In accordance with the present invention the heater means C comprises at least two radiant heater means disposed within the housing A adjacent the conveyor B. The heater means, to be described in more detail later, are supported above the conveyor B in a casing 76 which is maintained at a preselected height above the conveyor by means of brackets 78 which extend outward from leg portions 26. Mounted within the casing 76 in an inverted U-shaped cover plate 80 from which a plurality of insulating hangers 82 extend downwardly toward the conveyor B. In order to increase the efficiency of the heater means, insulating material 84, preferably of the reflective type, is provided intermediate the casing 76 and the cover plate 80. An additional sheet of insulating material 86 is provided directly beneath the top wall 16 to reflect the heat downwardly towards the conveyor B.

Figure 5:
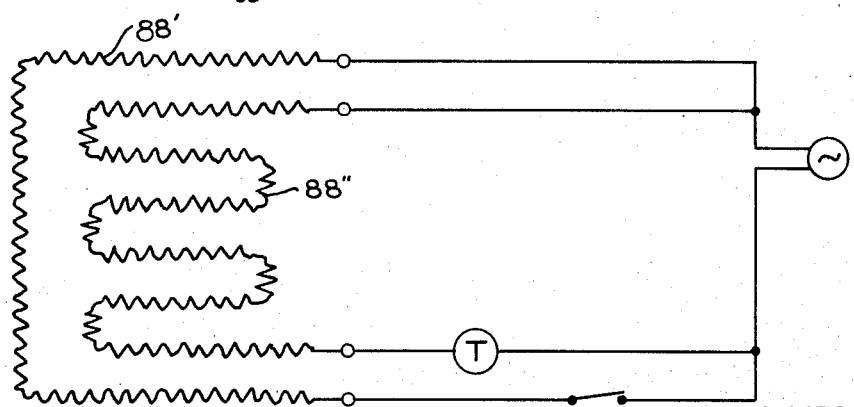
FIG. 5 illustrates heater means employed in a typical prior art device.

It is to be appreciated that the heater means of the past varied both in type and number. Thus, for example, as shown in FIG. 5, one prior art device employed a pair of electrical resistance coils 88', 88'' which were wound through insulating hangers in a conventional manner and connected to a source of electrical current. In this arrangement coil 88' acted as a preheater to maintain the interior of the apparatus at a desired temperature, but did not appreciably continue to the toasting of the articles. Also, its heating effect was non uniform across the surface of the conveyor. On the other hand, coil 88'', which has much higher electrical input, was primarily responsible for supplying the heat to completely toast the articles. The electrical energy supplied to the coil 88'' was then modulated by an electrical control to regulate the degree of toasting. As this coil 88'' has a high electrical input, the modulating control had to be of a substantial size.

The heat means of the present invention comprises at least two heating elements 90, 92 preferably constructed from sheath type elements such as, for example, Calrod, a trademarked product of the General Electric Company. Each of the heating elements 90, 92 is so arranged and shaped as to provide a generally uniform heating condition across substantially the entire transverse width of the conveyor B, as defined by the conveyor bars 44, and along at least a substantial portion of the longitudinal length of the conveyor which is adjacent and beneath the area encompassed by the casing 76.

Figure 4:
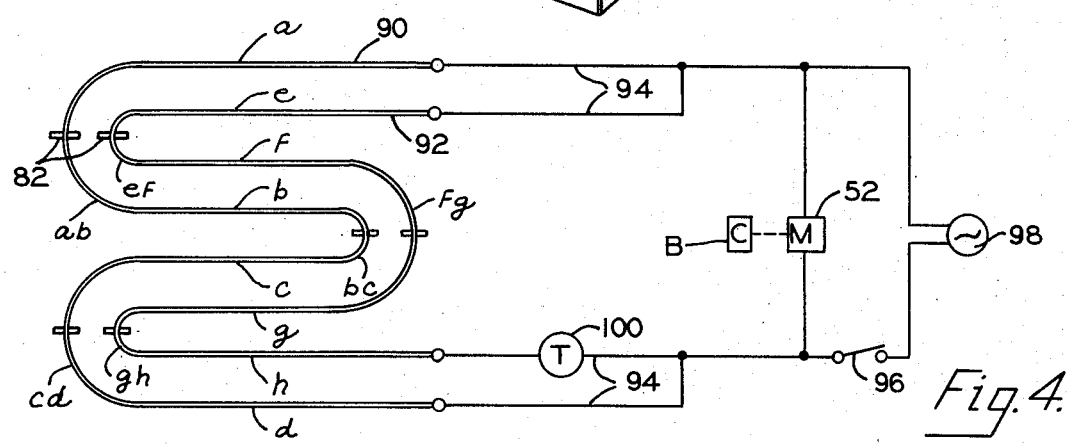
FIG. 4 is a cross-sectional schematic view taken along line 4—4 of FIG. 3.

As best shown in FIG. 4, heating element 90 comprises a plurality of generally parallel legs, designated generally by the reference letters $a$, $b$, $c$ and $d$, and heating element 92 comprises a plurality of generally parallel legs, designated by the reference letters $e$, $f$, $g$ and $h$.

Each of the parallel legs is joined by an interconnecting element portion, designated by the reference letters *ab*, *bc*, *cd*, *ef*, *fg* and *gh*. Preferably, each of the interconnecting portions is arcuate and has a preselected radius of curvature, the radius of curvature of one of the portions at one end of one of the heating elements being substantially equal to the radius of curvature of one of the portions at the opposite end of the other of the heating elements. Thus, for example, interconnecting portion *ab* of heating element 90 has a radius of curvature which is substantially equal to the radius of curvature of interconnecting portion *fg* of heating element 92. Additionally, interconnecting portion ab, which joins legs *a* and *b* and interconnecting portion *cd*, which joins legs *c* and *d*, have a greater radii of curvature than interconnecting portion *bc*, which joins legs *b* and *c*. The arrangement of heating element 92 is just the reverse, with interconnecting portion *fg* having a greater radius of curvature than the radii of curvature of interconnecting portions *ef* and *gh*. With this arrangement the legs of both heater elements and the end portions are all equally spaced. The radiant heat from each overlaps the radiant heat from the adjacent legs giving uniformity of heating.

The heating elements 90, 92 are connected by leads 94 in parallel with motor 52 and through switch 96 to an external power source 98. There is further provided a toasting regulator control 100 which controls the average energization of heating element 92. When the switch 96 is actuated, the motor 52 and heating elements 90, 92 are simultaneously energized, whereby the conveyor starts to move and the heating element 90 is brought up to its preselected heat output. Although energized when switch 96 is actuated, element 92 may initially remain below its desired heat output because of the control 100 setting.

Heating element 90 has a heat output across the width of the conveyor B sufficient of heat the articles to be toasted to a temperature at least approaching the caramelizing temperature, wherein the caramelizing temperature may be defined as the point at which the carbohydrate content of bread or similar articles is changed to a brown caramel-like color. Heating element 90 also has the effect of radiantly preheating heating element 92 in order that when further energized, element 92 will not have to pass through an extensive temperature range before additional toasting of the articles is realized. Heating element 92 is then further energized to have a maximum heat output such that when combined with heating element 90 the total heat is sufficient to further heat the articles to more than a fully toasted condition. The heat outputs of the heating elements 90, 92 are complimentary and by adjusting the toasting control 100, the average heat output of heating element 92 may be increased from its minimum to any desired value in order to provide a fully toasted condition on many different types of bread. This control 100 is adjustable so that the fully toasted article varies in color from light to dark brown. In order to accomplish the foregoing, preferably the heating element 90, 92 each have the same maximum power input and in the range from 800 to 1,400 watts each. 1,200 watts is preferred. Also, and with reference to FIG. 4, it will be appreciated that by having pulse controlled heating element 92 interwoven or in close proximity with constant heat output element 90, the radiating preheating effect on element 92 is increased. Again since element 92 is maintained at an elevated temperature by heat from element 90, it radiates efficiently immediately after control 100 is adjusted to increase the amount of time full current is pulsed to the element.

The control 100 is well known in the trade and need not be described in detail. Suffice it to say that it pulsed full current into the element 92 at a rate or time duration which can be readily varied by a control knob thus controlling the average heat input to the element 92.

The configuration of heating elements 90, 92, as illustrated in FIG. 4, represents the preferred embodiment of the present invention, and it is to be appreciated that a variation in shape and/or number is possible, provided a generally uniform heating condition exists across substantially the entire transverse width of the conveyor B and along at least a substantial portion of the longitudinal length of the conveyor adjacent the heating elements.

In operation, the conveyor B is started in motion by closing the switch 96, to energize the motor 52 and the heating element 90, thereby causing element 90 to produce its full heat output. Without element 92, the element 90 is capable of substantially heating, but not completely toasting the easiest or fastest kind of bread to toast. The toasting control 100 is then adjusted to obtain the desired level of toasting to be reached by the article. When the apparatus has been adjusted as above described, bread, buns, muffins, or any other edible article to be toasted, are placed upon the front of the conveyor through the horizontal receiving opening 20. The articles will then be carried by the conveyor B, at a constant rate of speed, under the heating elements 90, 92, whereby they will be toasted to the desired degree and then delivered upon the chute 64, near the upper end thereof. They will then slide down by gravity and stop on the bottom wall 14 adjacent the delivery opening 22. While in this position, they will be kept warm by the latent heat which is contained within the housing A until they are taken out through delivery opening 22.

Although the invention has been described with preference to specific embodiments, variations within the scope of the following claims will be apparent to those skilled in the art.

Having thus described our invention, we claim:

1. In an electric toasting apparatus comprising a conveyor adapted to support articles to be toasted and having a transverse width and a preselected rate of movement in a longitudinal direction, the improvement comprising:

a pair of heater means on one side of said conveyor and in an area extending longitudinally and transversely with respect to said conveyor, said pair of heating means being in overlapped relationship with respect to one another in said area to provide a heat transfer relationship therebetween and substantially throughout the longitudinal and transverse extents of said area, each of said heater means providing generally uniform heating conditions transversely and longitudinally relative to said conveyor; and, means for controlling the heat output of one of said heater means relative to the other.

2. The toasting apparatus defined in claim 1, wherein each of said heater means comprises a plurality of generally straight, parallel legs joined together by interconnecting portions, the legs of each said heater means being disposed in a close spaced apart relationship whereby one of said heater means will heat the other of said heater means during operation of said apparatus.

3. The toasting apparatus defined in claim 2, wherein at least a pair of legs of one heater means is disposed intermediate a pair of legs of the other heater means.

4. The toasting apparatus defined in claim 3, wherein each of said interconnecting portions is arcuate and has a preselected radius of curvature, the radius of curvature of one of said portions at one end of one of said heater means being substantially equal to the radius of curvature of one of said portions at the opposite end of the other of said heater means.

5. The toasting device defined in claim 1, wherein one heater means is comprised of a continuous heating element configured to define four parallel coplanar legs, each outer leg being joined to its adjacent inner leg by an arcuate interconnecting portion having a first radius of curvature and the inner legs being joined by an arcuate interconnecting portion having a second lesser radius of curvature, and the other heater means is comprised of a continuous heating element configured to define four parallel coplanar legs, each outer leg being joined to its adjacent inner leg by an arcuate interconnecting portion having said second radius of curvature and the inner legs being joined by an arcuate interconnecting portion having said first radius of curvature.

6. The apparatus defined in claim 1, further including a motor in driving engagement with said conveyor, switch means for controlling the operation of said motor and said heating means, whereby when said switch means is actuated said motor and one of said heating means are simultaneously fully energized and means for energizing said other heater means generally at less than full energization.

7. The toasting apparatus as defined in claim 6 wherein said one of said heating means is in a close spaced relationship with said other heating means whereby said one of said heating means is fully energized, said apparatus further including means for controlling the energization of said other heating means so that said average energization is small.

8. An electric toasting apparatus comprising:
a conveyor for receiving and conveying articles to be toasted;
first and second heater means on one side of said conveyor and in an area extending longitudinally and transversely with respect to said conveyor, said first and second heater means being in overlapped relationship with respect to one another in said area to provide a heat transfer relationship therebetween substantially throughout the longitudinal and transverse extents of said area, said first heater means having a heat output sufficient to heat the articles to a temperature at least approaching caramelizing temperature and to preheat said second heater by means of radiation, and said second heater means having a maximum heat output sufficient to further heat the articles to more than a fully toasted condition; and,
means for controlling the heat output of said second heater means independently of the heat output of said first heater means.

9. The apparatus as defined in claim 8, wherein each of said heater means is electrical and has a maximum power input within the range from 800 to 1,400 watts, said control means being operable to control said second heater means to lower the power input thereto from said maximum.

* * * * *